US006902356B2

(12) United States Patent
Breitenmoser

(10) Patent No.: US 6,902,356 B2
(45) Date of Patent: Jun. 7, 2005

(54) HAND TOOL WITH TOOL BIT STORAGE RECEPTACLE

(75) Inventor: Armin Breitenmoser, Wattwil (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/813,287

(22) Filed: Mar. 30, 2004

(65) Prior Publication Data

US 2004/0191021 A1 Sep. 30, 2004

(30) Foreign Application Priority Data

Mar. 31, 2003 (DE) .................................... 203 05 133 U

(51) Int. Cl.[7] ......................... B23B 39/10; B23B 45/00; B23B 47/00

(52) U.S. Cl. .................. 408/124; 408/241 R; 81/177.4; 81/490; 16/111.1

(58) Field of Search ............................ 408/241 R, 124; 81/177.1, 177.4, 490; 16/111.1, 426; 279/150

(56) References Cited

U.S. PATENT DOCUMENTS 2,545,659 A * 3/1951 Ginter ......................... 16/426
4,653,356 A * 3/1987 Golden ....................... 81/57.14
4,790,696 A * 12/1988 Williams ................ 408/241 R
4,932,294 A * 6/1990 Chang ......................... 81/490
4,934,223 A * 6/1990 Wong .......................... 81/490
5,810,525 A * 9/1998 Ector, Sr. ................ 408/241 R
6,334,743 B1 * 1/2002 Liao ............................ 408/16
6,364,580 B1 * 4/2002 Dils et al. ..................... 408/16
6,742,421 B1 * 6/2004 Chen ........................... 81/490

FOREIGN PATENT DOCUMENTS

DE 3514023 A1 * 10/1986 ........... B23B/45/00

* cited by examiner

*Primary Examiner*—Daniel W. Howell
*Assistant Examiner*—Ali Abdelwahed
(74) *Attorney, Agent, or Firm*—Sidley Austin Brown & Wood, LLP

(57) ABSTRACT

A motor driven hand tool has a motor housing (6) with a main handle (8) near its rear end and an auxiliary bracket (10) spaced ahead of the main handle. The auxiliary bracket has a storage receptacle (16) for holding a plurality of tool bits. Partial sliding covers (26, 30) close the storage receptacle.

6 Claims, 3 Drawing Sheets

HAND TOOL WITH TOOL BIT STORAGE RECEPTACLE

BACKGROUND OF THE INVENTION

The invention relates to a motor powered hand tool such as a drilling and/or screwing tool, having a motor/gearing housing from which a main handle projects outwardly; that is, it extends transversely from the housing, making it possible, for example, to hold and at the same time start up the hand tool using an operating switch with one hand and a work receptacle, into which one of a plurality of tool bits can be mounted and a supply receptacle, in which a plurality of the tool bits are held and from which they can be removed.

Motor—driven drilling and/or screwing tools can generally be loaded with a number of tool bits in different sizes and shapes. In this case it is advantageous, if a specific supply, in particular of frequently used tool bits, are stored on the hand tool. Accordingly, the operator has the required tool bits available on the hand tool at all times. Complicated storage of the tool bits in a separate storage assembly, such as a tool box, is thus eliminated.

A number of devices are well-known from the prior art, making it possible to securely clamp one or a plurality of bits in the housing of the hand tool. In this case there is the drawback, that generally only a very limited number of bits can be stored on the hand tool, without the required structural space of the storage receptacle taking a toll on the ease of handling and/or the compact form of the hand tool.

In addition, in this general type of clamping assembly, there is the problem that either the clamping force is inadequate to securely hold the tool bits consistently even under the conditions of operation or that the clamping force is so great, that the tool bits can be removed only with considerable application of force.

In order to avoid these problems, in some hand tools the storage receptacle is integrated in tool elements, which can provide in their interiors a specific space therefor.

DE87 03 265 U1 discloses a drill machine, having a removable supplemental handle alongside the main handle, which is securely clamped on a shaft of the drill machine by means of a clamping sleeve. The auxiliary handle has an essentially annular storage receptacle for screwdriver bits on the clamping sleeve. In addition, a plurality of bore holes are formed on a hinged free end of a handle part of the auxiliary handle, wherein various drill bits can be accommodated. Both storage receptacles are closed by a rotatable cover, which has an aperture. For removing or inserting a screwdriver bit or a drill bit, the respective opening is positioned by rotating the respective cover in the direction of alignment of the desired drilling.

The drawback in the storage receptacle in the auxiliary handle is that it is removed in the event of numerous uses of the hand tool for working difficult to access work pieces. In the case of the removed auxiliary handle, the operating person, however, does not have access to a supply of tool bits directly on the hand tool itself, whereby the actual advantages of the storage receptacle are lost. In addition, handling of both storage receptacles is relatively complicated because the covers have to be rotated.

Furthermore, the two apertures in the covers have the effect, that external contamination such as dust can reach the inside of both storage receptacles of the auxiliary handle, which results over time in a fouling of the tool bits and in increasing difficulty in rotating the cover over the respective storage receptacle.

SUMMARY OF THE INVENTION

The object of the present invention is to avoid the aforesaid drawbacks in a motor driven hand tool and to assure ease of use with reliable closure of the storage receptacle.

According to the invention, this object is achieved in that the storage receptacle is arranged in an additional bracket grip, such as an auxiliary bracket that can be used as a hand guard or as an additional support member for a battery pack, for example, and which in addition to the handle is formed laterally projecting from the motor housing and on which at least one sliding cover is guided, which in a closing position closes off the storage receptacle and in a slidably released position opens it.

A simple opening and closing of the storage receptacle is achieved by virtue of the sliding cover held slidably on the auxiliary handle. In addition, accidental falling out of the tool bits from the storage receptacle, for example, in consequence of the vibrations occurring during operation, can be prevented by the sliding cover.

Furthermore, the storage receptacle can be completely closed by means of the sliding cover, whereby fouling of same and the tool bits contained therein can be prevented.

Advantageously, the storage receptacle has a plurality of first recesses, which are arranged transverse to the working direction of the hand tool and also transverse to the longitudinal extension of the auxiliary bracket. In addition, the first recesses open towards a first side surface of the auxiliary bracket. In this way, the tool bits can be removed from the side of the storage receptacle or inserted thereinto relative to the working direction of the hand tool. In this fashion, the storage receptacle is particularly easy to access, which further improves its ease of handling.

Preferably, the storage receptacle has at least a second recess, which is arranged in the sense of the longitudinal extension of the auxiliary bracket and is opened towards an opposite second side surface of the auxiliary bracket. By virtue of the arrangement of the second recess in the longitudinal direction of the auxiliary bracket, it is possible to arrange the second recess to be relatively long. In this way, it is possible to accommodate in the storage receptacle normal tool bits and also longer tool elements such as bit elements in the form of bit extensions or bit holders, for example.

Advantageously, the sliding cover has a first partial sliding cover on the first side surface, and a separately guided by a second partial sliding cover on the second side surface on the auxiliary bracket. In this fashion, the storage receptacle can be opened on one side, if required, in order to remove or insert tool bits or other tool elements. The other part of the storage receptacle can, on the other hand, remain closed, in order to prevent the tool bits contained therein from falling out or from becoming soiled. In addition, due to the two part configuration of the sliding cover, it makes easier assembly possible.

Preferably, at least one clamping assembly is arranged in a recess, whereby it is made possible, that even in the release position the concerned tool bit or tool element does not unintentionally fall out of the storage receptacle. The clamping assembly can then be so designed, that the clamping force is just great enough that comfortable removal of the concerned tool bit is possible without greater effort, because the actual safeguard against falling out is provided by the sliding cover during operation.

In a particularly preferred embodiment, the sliding cover has at least one locking means, which locks the auxiliary bracket in the closed position and/or in the released position with at least one counter-locking means. By virtue of this type of locking assembly it is possible to hold the sliding cover securely in the opened position when in the released position, in order to achieve unimpaired removal or insertion of a tool bit. In addition, because of the locking assembly it is assured that the sliding cover does not unintentionally open because of the vibrations occurring during operation.

BRIEF DESCRIPTION OF THE DRAWING

The invention will be explained in more detail using an exemplary embodiment. Wherein.

DETAILED DESCRIPTION OF THE INVENTION

Figure 1:
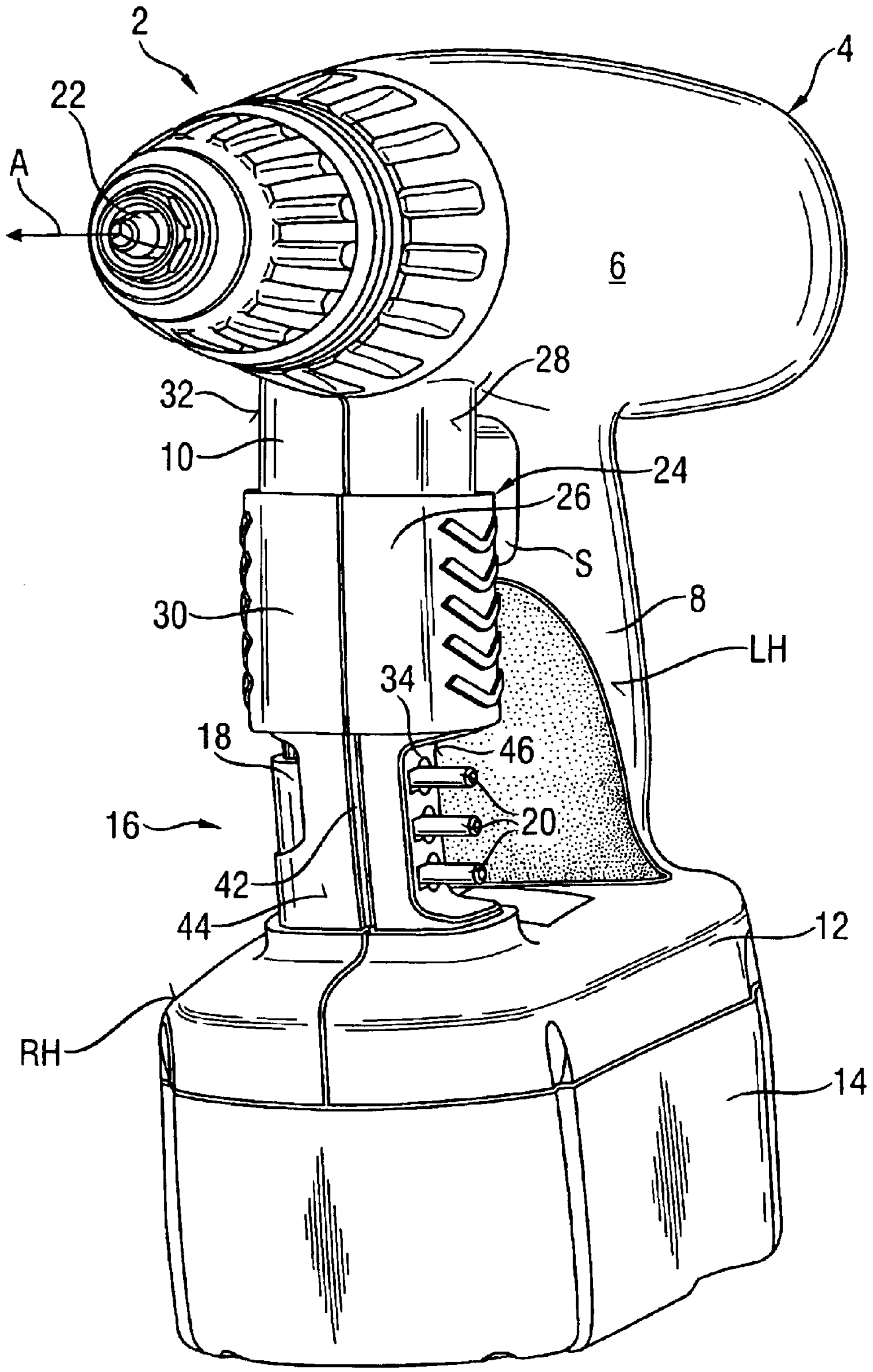
FIG. 1 is a perspective view of a hand tool according to the invention with a storage receptacle and a sliding cover in the released position.

FIG. 1 shows a motor driven hand tool 2 in the form of a drill screwdriver, with a housing 4 comprised of a left housing part LH and a right housing part RH, as viewed in the rear to front direction of the housing, which is essentially subdivided into a motor/gearing housing 6, a main handle 8, an auxiliary bracket 10 and a battery pack hook-up part 12. A battery pack 14 is detachably fastened to the battery pack connection part 12.

As shown, a switch S is arranged on the main handle 8 for operating the hand tool so that an operator can hold the hand tool 2 with one hand at the main handle 8 and start its operation simultaneously with the same hand.

The auxiliary bracket 10 is arranged mounted in front of and spaced from the main handle 8 in a working direction of axis A and extends outwardly in the direction of the main handle, essentially parallel, away from the motor/gearing housing 6. The auxiliary bracket 10 is used on the one hand together with the main handle 8 as an additional support member, which favors satisfactory balancing of the battery pack 14 on the rest of the hand tool 2. On the other hand, the auxiliary bracket 10, by virtue of its arrangement opposite to and spaced from the main handle 8 represents a hand guard in the working direction of axis A.

At one end facing towards the battery pack 14, the auxiliary bracket 10 has a storage receptacle 16, in which an elongated tool element 18 in the form of a bit holder and several tool bits 20 in the form of differently shaped screwing or drilling bits are held. Each of the tool bits 20 or the tool elements 18 is provided for a specific application of the hand tool 2 and can be affixed in a working receptacle 22, which is arranged at the front end of the hand tool 2, in the working direction A.

In addition a sliding cover 24 is slidably held on the auxiliary bracket 10. The sliding cover 24 has a first partial sliding cover 26, which is slidably displaceably along a left side surface 28 and a second partial sliding cover 30, which is slidable along the right side surface 32 of the auxiliary bracket 10. The side surfaces 28, 32 form in this case the delimitations of the auxiliary bracket 10 transverse to the working direction A.

Figure 2:
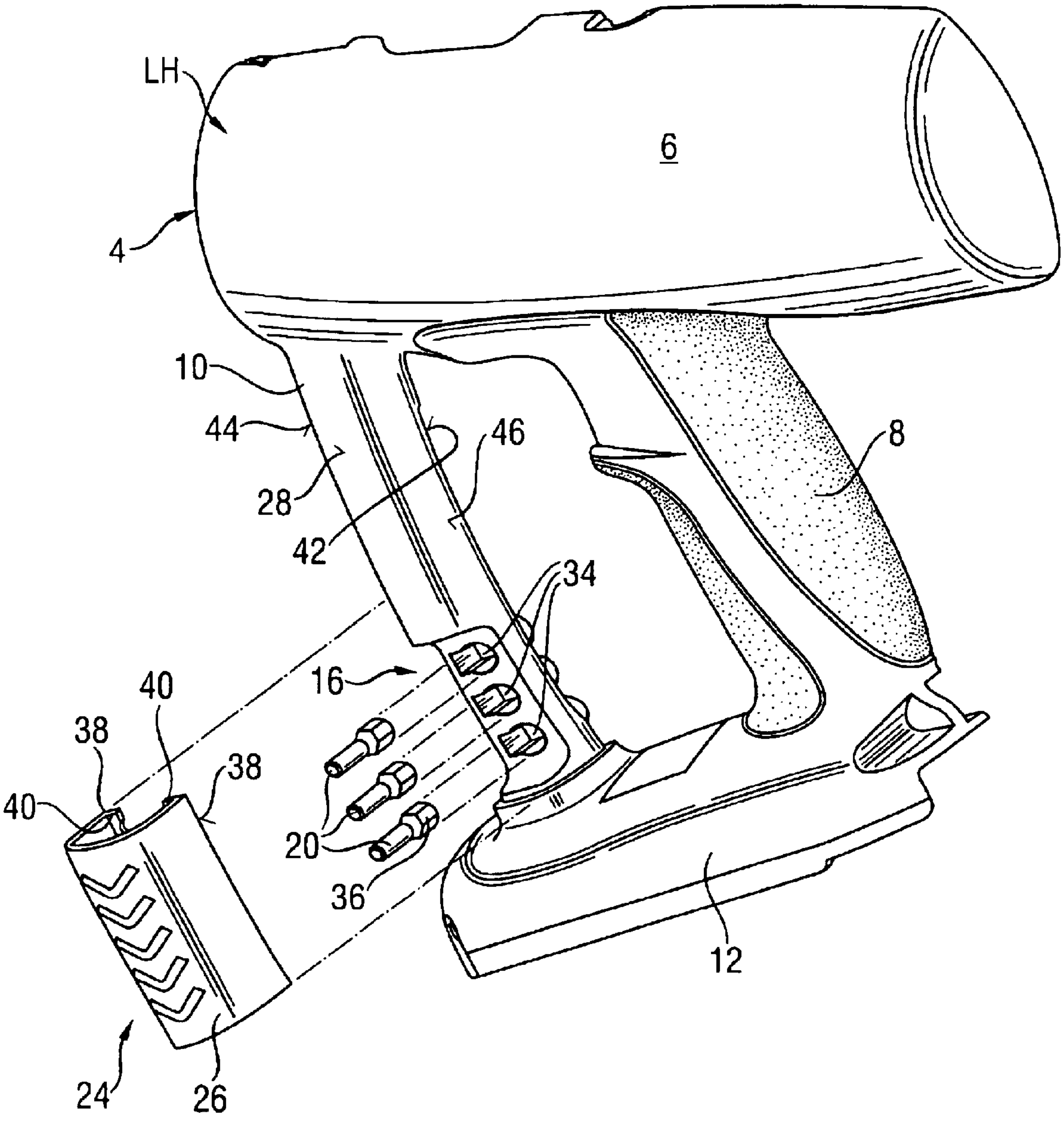
FIG. 2 is a perspective view of a housing half of the hand tool according to FIG. 1 with the sliding cover shown removed.

FIG. 2 represents the left housing half LH of the housing 4, which includes the left side surface 28. As can be seen in the drawings, the storage receptacle 16 has a plurality of first recesses 34, which are arranged transverse to the working direction A and to the longitudinal extension of the auxiliary bracket 10 and open in the direction of the first side surface 28. The tool bits 20 can be inserted into these first recess 34 at an insertion end 36.

As can be seen further in FIG. 2, the first partial sliding cover 26 has an approximately U-shaped cross-section. At both ends 38 of the U-shaped cross section the first partial sliding cover 26 has an engagement region 40, with which the first partial sliding cover 26 engages in one of two guide slots 42 (FIG. 1), which, viewed in the working direction A, are formed at a front side 44 and a back side 46 of the auxiliary bracket 10. In this fashion, the first partial sliding cover 26 is held at the left housing half LH (shown here) of the housing 4 and accordingly runs along the guide slot 42 on the auxiliary bracket 10. In appropriate fashion, the slidable mounting of the second partial sliding cover 30 can be done on the right housing half RH of the housing 4. Both partial sliding covers 26, 30 can herein be guided independently of each other on the respective housing half, LH or RH. In this way the partial sliding covers 26, 30 can be brought into its released position, while the other partial sliding cover 30, 26 remains in its closed position. In the alternative hereto, both partial sliding covers 26, 30 can also be coupled to each other by means of a latching or screw connection, for example. The two-part design of the sliding cover 24 serves in this case on the one hand in its facilitated assembly and on the other hand in its more stable guide vis-à-vis the auxiliary bracket 10.

Figure 3:
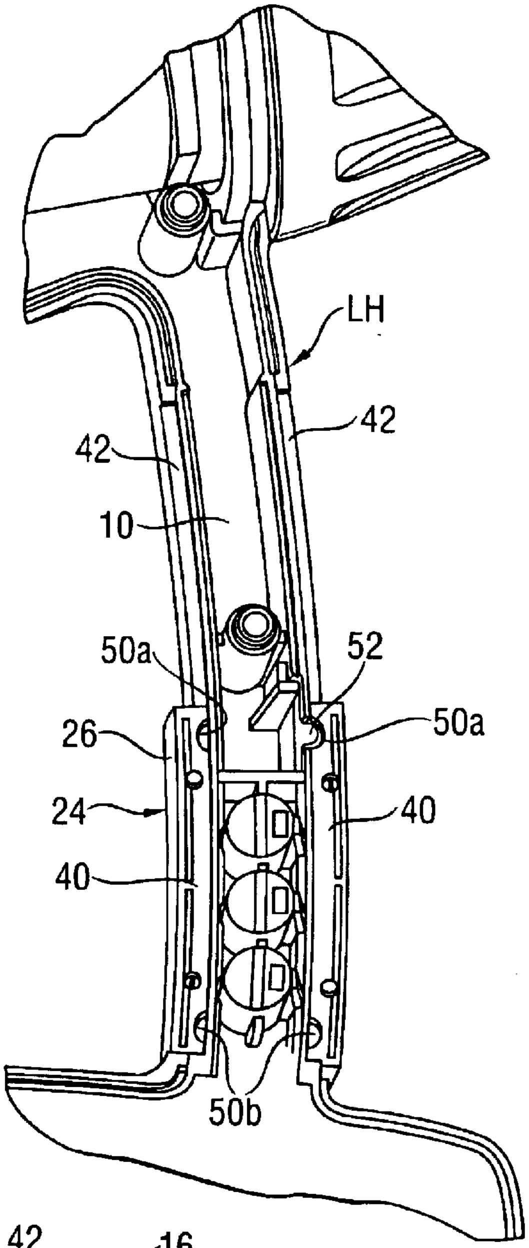
FIG. 3 is a perspective partial view of the interior of the housing half according to FIG. 2 in the region of the auxiliary bracket.

FIG. 3 shows the rear side of the left housing half LH of FIG. 2 in the region of the auxiliary bracket 10. In contrast with the released position of the sliding cover 24 represented in FIG. 1, the first partial sliding cover 26 is represented here in a closed position. In this connection it can be seen that the first partial sliding cover 26 has on its grip regions 40 a total of four latching members or receivers **50*a*, 50*b* in the form of engagement depressions. At one end on the side of the first partial sliding cover 26 a counter latching member 52 in the form of a latch spring projects into one of the latching receivers 50*a*. The corresponding latching arrangement is also provided at the second partial sliding cover 30 and the right housing half RH of the housing 4**.

Figure 4:
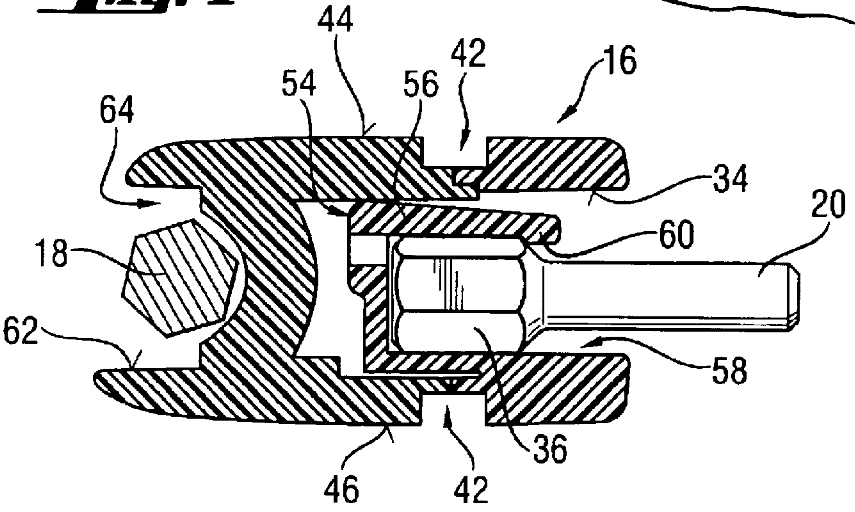
FIG. 4 is a cross-section of the auxiliary bracket in the region of the storage receptacle.

A section through the storage receptacle 16 is represented in FIG. 4. As can be seen herein, a clamping assembly 54 is provided in each of the recesses 34. The clamping assembly 54 has a deformable wall element 56, which forms a clamping projection 60 towards the first opening 58 of the first recess 34.

Upon insertion of a tool bit 20, this comes into contact with its insertion end 36 with the clamping projection 60 and urges it upon simultaneous deformation of the wall element 56 to the side. As soon as the insertion end 36 is completely inserted into the clamping assembly 54, the clamping projection 60 engages over the end of the insertion end 36 on the opening side and thus securely clamps the tool bit 20 in the first recess 34.

Further, FIG. 4 represents the section of a second recess 62, which extends in the direction of the longitudinal extension of the auxiliary bracket 10. In this recess, the elongated tool element 18 is inserted and can be removed via a second opening 64.

To remove or insert a tool bit 20 or a tool element 18, the concerned partial sliding cover 26, 30 is brought from the closed position into the released position. When this is done, latching of the spring-like counter latching means 52 is released from the gearing-side latching means 50*a* of the partial sliding cover 26, 30 and locked in the released position in the latching means 50*b* on the battery pack side.

Accordingly, the concerned partial sliding cover 26, 30 is automatically held in the released position. As a result, the tool bit 20 or the tool element 18 can now be inserted unimpaired into the storage receptacle 16 or it can be removed from same. In this way, the clamping assembly 54 prevents the tool bit 20 or the tool element 18 from unintentionally falling out of the storage receptacle 16 when in the released position.

As soon as the desired tool bit 20 or the tool element 18 is removed or inserted, the partial sliding cover 26, 30 is brought again into the closed position and latched thereinto as hereinbefore described. In this fashion, the storage receptacle 16 is securely closed, so that even during operation of the hand tool 2 and any vibration or impact occurring in that situation, no tool bit 20 or tool element 18 can unintentionally fall out of the storage receptacle 16 and no external fouling can gain entry into the storage receptacle 16.

What is claimed is:

1. A motor driven hand tool (2) comprises a motor housing (6) having a drive axis (A) with a leading end and a trailing end spaced apart in the direction of the drive axis, a main handle (8) projecting transversely outwardly of said motor housing adjacent to the trailing end thereof, a working tool receptacle (22) at the leading end of said motor housing (6) arranged to mount one of a plurality of tool bits (20), a storage receptacle (16) for removably fixing of said plurality of tool bits (20), an auxiliary bracket (10) extending longitudinally outwardly from said motor housing and spaced in the direction of said drive axis from said main handle toward the leading end of said motor housing, said storage receptacle (16) located in said auxiliary bracket (10), at least one cover (24) slidably displaceable on said auxiliary bracket (10) and movable between a first position closing said storage receptacle (16) and a second position affording access to remove tool bits from said storage receptacle.

2. A motor driven hand tool, as set forth in claim 1, wherein said storage receptacle (16) has a plurality of first recesses (34) arranged transversely of the drive axis (A) and transversely of the longitudinal direction of said auxiliary bracket (10) and open in a first lateral surface (28) of said auxiliary bracket (10).

3. A motor driven hand tool, as set forth in claim 2, wherein said storage receptacle (16) has at least one second recess (62) extending generally parallel to the longitudinal direction of said auxiliary bracket (10) and opens in a second lateral surface (32) of said auxiliary bracket (10).

4. A motor driven hand tool, as set forth in claim 3, wherein said cover (24) comprises a first and second sliding cover (30) on said second lateral surface (32) and the first sliding cover (26) is on said first lateral surface is guided independently from the second sliding cover along the auxiliary bracket (10).

5. A motor driven hand tool, as set forth in claim 4, wherein at least one clamping assembly (54) is located in said first recess (34) for securing said tool bits (20) therein.

6. A motor driven hand tool, as set forth in claim 1, wherein said at least one sliding cover has at least one latching member for snap-on connection with at least one counter latching member (50*a*, 50*b*) of the auxiliary bracket (10) in the first position and/or in the second position.

* * * * *